United States Patent
Sato

(10) Patent No.: US 8,422,470 B2
(45) Date of Patent: Apr. 16, 2013

(54) COMMUNICATION SYSTEM AND MAIN COMMUNICATION DEVICE AND AUXILIARY COMMUNICATION DEVICE OF COMMUNICATION SYSTEM

(75) Inventor: Katsuhiro Sato, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 848 days.

(21) Appl. No.: 12/538,737

(22) Filed: Aug. 10, 2009

(65) Prior Publication Data

US 2010/0034184 A1 Feb. 11, 2010

(30) Foreign Application Priority Data

Aug. 8, 2008 (JP) ................................. 2008-205655

(51) Int. Cl.
*H04W 4/00* (2009.01)
*G01R 31/08* (2006.01)
(52) U.S. Cl.
USPC ......................................... 370/338; 370/231
(58) Field of Classification Search .................. 370/231, 370/338
See application file for complete search history.

(56) References Cited

U.S. PATENT DOCUMENTS

2005/0174939 A1* 8/2005 Willey et al. .................. 370/231
2008/0267150 A1* 10/2008 Rofougaran .................. 370/338

FOREIGN PATENT DOCUMENTS

JP 2005-295895 10/2005
JP 2007-274537 10/2007

* cited by examiner

*Primary Examiner* — Ian N Moore
*Assistant Examiner* — Kiet Tang
(74) *Attorney, Agent, or Firm* — Scully, Scott, Murphy & Presser PC

(57) ABSTRACT

A communication system comprises a main communication device including a first communication unit executing wireless communication by a first method (mainly for voice data communication) and a second communication unit executing wireless communication by a second method (for communication of data other than voice data at a higher transfer rate) and an auxiliary communication device (operating on a secondary battery) including first and second auxiliary communication units executing wireless communication with the first and second communication units by the first and second methods, respectively. Whether communication of data (except voice data) should be executed by the first method or by the second method is determined based on the amount of the data. When the first method is selected, the data is segmented in prescribed data units and the communication of the segmented data is executed by the first communication unit and the first auxiliary communication unit by the first method.

15 Claims, 6 Drawing Sheets

COMMUNICATION SYSTEM AND MAIN COMMUNICATION DEVICE AND AUXILIARY COMMUNICATION DEVICE OF COMMUNICATION SYSTEM

CROSS-REFERENCE TO RELATED APPLICATION

This application claims priority under 35 U.S.C. §119 from Japanese Patent Application No. 2008-205655 filed on Aug. 8, 2008. The entire subject matter of the application is incorporated herein by reference.

BACKGROUND

1. Technical Field

The present invention relates to a communication system, a main communication device of the communication system, and an auxiliary communication device of the communication system 2. Related Art Various communication systems for executing data communication and voice communication using a prescribed frequency band are known and used today. In such communication systems, the same frequency band can be used for both data communication and voice communication. For example, a 2.4 GHz band, which is called an "ISM (Industry Science Medical) band", is used for both wireless LANs (Local Area Networks) for the purpose of data communication and DCL (Digital CordLess) telephones for the purpose of voice communication.

For the wireless LANs and DCL telephones, multiple channels obtained by segmenting a prescribed frequency band are assigned separately to the two communication methods. In the following description, a channel used for wireless LANs will be referred to as a "WLAN channel" while a channel used for DCL telephones will be referred to as a "DCL channel" in order to discriminate between the channels for the two communication methods.

In a wireless LAN, a frequency band from 2.4 GHz to 2.5 GHz is segmented into fourteen WLAN channels (wch1-wch14). Among the fourteen WLAN channels, a WLAN channel assigned once is used continuously. Incidentally, the wireless communication in a wireless LAN is carried out by executing the spread spectrum modulation to the data to be transmitted while continuously using the one WLAN channel already assigned.

On the other hand, for DCL telephones, the frequency band from 2.4 GHz to 2.5 GHz is segmented into eighty-nine DCL channels (dch1-dch89). Among a prescribed number of DCL channels (e.g. forty-five DCL channels) previously selected from the eighty-nine DCL channels, a DCL channel to be used is successively switched (hopping) at prescribed periods called "hopping periods" (e.g. $\frac{1}{100}$ seconds). As above, the wireless communication by DCL telephones is carried out by successively switching the DCL channel at prescribed periods.

As explained above, the frequency band from 2.4 GHz to 2.5 GHz is segmented into eighty-nine DCL channels for DCL telephones whereas the same frequency band is segmented into fourteen WLAN channels for wireless LANs. Thus, the frequency bandwidth of a WLAN channel used for a wireless LAN is approximately 20 MHz, which is far wider than that of a DCL channel used for DCL telephones (less than 1 MHz). For this reason, the wireless LAN communication (wireless communication via a wireless LAN), enabling a higher data transfer rate (per unit time) compared to the DCL wireless communication (wireless communication by DCL telephones), is used a lot for data communication.

A technology (wireless communication system) for executing data communication by the wireless LAN communication while also executing voice communication by the DCL wireless communication is widely known.

SUMMARY

However, since the data transfer rate (per unit time) of the wireless LAN communication is far higher than that of the DCL wireless communication as mentioned above, the technology (wireless communication system) described above is required to realize high-speed processing of received data and data to be transmitted. For this purpose, the number of operations (per unit time) of a processing circuit used for the wireless LAN communication is necessitated to be far larger than that of a processing circuit used for the DCL wireless communication. Thus, compared to the DCL wireless communication, the wireless LAN communication causes a considerable increase in the electric current and electric power (per unit time) consumed by the processing circuits. In a communication device operating on a secondary battery, the secondary battery is consumed quickly when the communication device carries out the data communication heavily using the wireless LAN communication.

Aspects of the present invention, which has been made in consideration of the above problems, provide a communication system, a main communication device of the communication system, and an auxiliary communication device of the communication system, capable of reducing the use of the wireless LAN communication and thereby slowing the consumption of the secondary battery (power source of the auxiliary communication device).

In accordance with an aspect of the present invention, there is provided a communication system comprising a main communication device including a first communication unit which executes wireless communication by a first method which is used mainly for communication of voice data obtained by signal processing of voice and a second communication unit which executes wireless communication by a second method which is used for communication of data other than voice data at a higher data transfer rate per unit time than the first method, an auxiliary communication device operating on electric power supplied by a secondary battery and including a first auxiliary communication unit which executes wireless communication with the first communication unit by the first method and a second auxiliary communication unit which executes wireless communication with the second communication unit by the second method, a data amount detecting unit which detects the amount of data to be communicated when data other than voice data is communicated, a communication method determining unit which determines whether the communication of the data other than voice data should be executed by the first method or by the second method based on the amount of the data other than voice data detected by the data amount detecting unit, a data segmentation unit which obtains segmented data by segmenting the data other than voice data in prescribed data units when the communication method determining unit determines that the communication of the data other than voice data should be executed by the first method, and an execution unit which makes the first communication unit and the first auxiliary communication unit execute the communication of the segmented data obtained by the data segmentation unit by the first method.

In accordance with another aspect of the present invention, there is provided a main communication device of a communication system, comprising a first communication unit which executes wireless communication with a first auxiliary communication unit of an auxiliary communication device (operating on electric power supplied by a secondary battery) by a first method which is used mainly for communication of voice data obtained by signal processing of voice, a second communication unit which executes wireless communication with a second auxiliary communication unit of the auxiliary communication device by a second method which is used for communication of data other than voice data at a higher data transfer rate per unit time than the first method, a data amount detecting unit which detects the amount of data to be communicated when data other than voice data is communicated, a communication method determining unit which determines whether the communication of the data other than voice data should be executed by the first method or by the second method based on the amount of the data other than voice data detected by the data amount detecting unit, a data segmentation unit which obtains segmented data by segmenting the data other than voice data in prescribed data units when the communication method determining unit determines that the communication of the data other than voice data should be executed by the first method in data transmission to the auxiliary communication device, an execution unit which makes the first communication unit execute the transmission of the segmented data obtained by the data segmentation unit by the first method, and an instruction information transmission unit which makes the first communication unit transmit instruction information (instructing the auxiliary communication device to transmit data other than voice data by the first method) by the first method when the communication method determining unit determines that the communication of the data other than voice data should be executed by the first method in data reception from the auxiliary communication device.

In accordance with another aspect of the present invention, there is provided an auxiliary communication device of a communication system, comprising a secondary battery which supplies electric power for the operation of the auxiliary communication device, a first auxiliary communication unit which executes wireless communication with a first communication unit of a main communication device of the communication system by a first method which is used mainly for communication of voice data obtained by signal processing of voice, a second auxiliary communication unit which executes wireless communication with a second communication unit of the main communication device by a second method which is used for communication of data other than voice data at a higher data transfer rate per unit time than the first method, a data amount detecting unit which detects the amount of data to be transmitted when data other than voice data is transmitted to the main communication device, a data amount transmission unit which makes the first auxiliary communication unit transmit data amount information (indicating the amount of the data other than voice data detected by the data amount detecting unit) by the first method, a data segmentation unit which obtains segmented data by segmenting the data other than voice data in prescribed data units when instruction information (instructing the auxiliary communication device to transmit the data other than voice data by the first method) is received by the first auxiliary communication unit in response to the data amount information transmitted by the data amount transmission unit using the first auxiliary communication unit, and an auxiliary execution unit which makes the first auxiliary communication unit execute the transmission of the segmented data obtained by the data segmentation unit by the first method.

Other objects, features and advantages of the present invention will become more apparent from the consideration of the following detailed description taken in conjunction with the accompanying drawings.

BRIEF DESCRIPTION OF THE ACCOMPANYING DRAWINGS

DETAILED DESCRIPTION OF THE EMBODIMENTS

Figure 1:
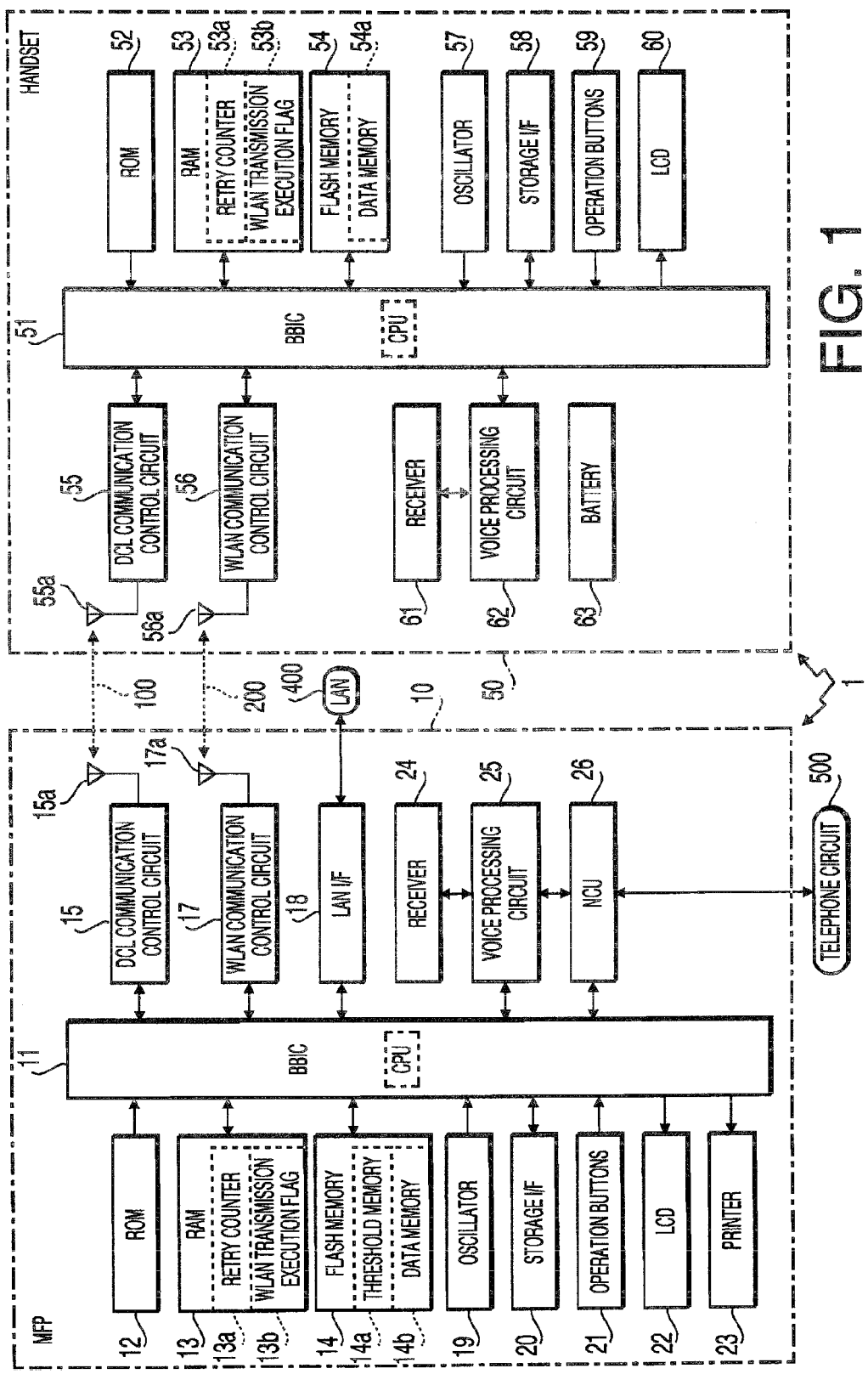
FIG. 1 is a block diagram showing the electrical configuration of a wireless communication system in accordance with an embodiment of the present invention.

Referring now to the drawings, a description will be given in detail of a preferred embodiment in accordance with the present invention.

As shown in FIG. 1, the wireless communication system 1 includes an MFP (Multi Function Peripheral) 10 and a digital cordless handset 50 (hereinafter referred to simply as a "handset 50") which executes wireless communication with the MFP 10.

In the wireless communication system 1, the MFP 10 is a device having a DCL (Digital CordLess) telephone function of executing voice communication with the handset 50 by DCL (Digital CordLess) wireless communication 100, a data communication function of executing data communication with the handset 50 by the DCL wireless communication 100, a WLAN (Wireless LAN) function of executing data communication with the handset 50 by wireless LAN communication 200, a fixed-line telephone function of executing voice communication with an external telephone set (unshown) via a telephone circuit 500, and a print function of printing image data received via the above functions by use of a printer 23.

In the DCL wireless communication 100, a frequency band from 2.4 GHz to 2.5 GHz is segmented into eighty-nine DCL channels (dch1-dch89) and the wireless communication is carried out by successively switching the DCL channel to be used (hopping) among a prescribed number of DCL channels (e.g. forty-five DCL channels previously selected from the eighty-nine DCL channels) at prescribed periods called "hopping periods" (e.g. 1/100 seconds).

On the other hand, in the wireless LAN communication 200, the frequency band from 2.4 GHz to 2.5 GHz is segmented into fourteen WLAN channels (wch1-wch14) and the wireless communication is carried out by executing the spread spectrum modulation while continuously using one WLAN channel which has been selected and assigned from the fourteen WLAN channels.

As above, the DCL wireless communication 100 segments the frequency band (from 2.4 GHz to 2.5 GHz) into eighty-nine DCL channels whereas the wireless LAN communication 200 segments the frequency band into fourteen WLAN channels. Thus, the frequency bandwidth of a WLAN channel used for the wireless LAN communication 200 is approximately 20 MHz, which is far wider than that of a DCL channel used for the DCL wireless communication 100 (less than 1 MHz). For this reason, the wireless LAN communication 200 (enabling a higher data transfer rate (per unit time) compared to the DCL wireless communication 100) is used a lot for communication of various types of data (whose data volume is larger than that of voice data used for the voice communication).

However, due to the far higher data transfer rate (per unit time) of the wireless LAN communication 200 compared to the DCL wireless communication 100, high-speed processing of received data and data to be transmitted becomes necessary. For this purpose, the number of operations (per unit time) of a processing circuit used for the wireless LAN communication 200 is necessitated to be far larger than that of a processing circuit used for the DCL wireless communication 100. Further, operating time of a power amplifier inside the processing circuit used for the wireless LAN communication 200 also increases in order to carry out the spread spectrum modulation (across a wide range) to the various types of data communicated. Thus, compared to the DCL wireless communication 100, the wireless LAN communication 200 raises the electric current and electric power (per unit time) consumed by the processing circuits. In the handset 50 operating on a secondary battery, the secondary battery is consumed quickly when the communication of various types of data is executed heavily using the wireless LAN communication 200.

In the wireless communication system 1 of this embodiment, when the amount of data to be communicated is less than a threshold value in the communication of various types of data, the data is segmented in units of packets and the communication of the segmented packet data is carried out by using the DCL wireless communication 100, by which the use of the wireless LAN communication 200 is reduced and the consumption of the secondary battery (power source of the handset 50) is slowed down.

Next, the electrical configuration of the MFP 10 will be explained. As shown in FIG. 1, the MFP 10 includes a BBIC (Base Band Integrated Circuit) 11, a ROM (Read Only Memory) 12, a RAM (Random Access Memory) 13, a flash memory 14, a DCL (Digital CordLess) communication control circuit 15, a DCL antenna 15a, a WLAN (Wireless LAN) communication control circuit 17, a WLAN antenna 17a, a LAN I/F (interface) 18, an oscillator 19, a storage I/F 20, operation buttons 21, an LCD (Liquid Crystal Display) 22, the printer 23, a receiver 24, a voice processing circuit 25 and an NCU (Network Control Unit) 26.

The BBIC 11 includes a conversion circuit, a restoration circuit, a processing circuit and an I/O (Input/Output) port. The conversion circuit converts various types of data to be transmitted from the MFP 10 (e.g. image data) into data of a format that can be transmitted by the DCL communication control circuit 15 or the WLAN communication control circuit 17. The restoration circuit restores data received from the DCL communication control circuit 15 or the WLAN communication control circuit 17 to data of the original type (e.g. image data). The processing circuit controls components connected to the BBIC 11 according to fixed values and programs stored in the ROM 12 and the RAM 13 and signals communicated via the DCL communication control circuit 15, the WLAN communication control circuit 17 or the NCU 26. The I/O port controls signal communication among the components connected to the BBIC 11.

The ROM 12 is a non-rewritable nonvolatile memory storing control programs to be executed by the MFP 10, fixed values to be referred to by the control programs, etc. Examples of the control programs are shown in flowcharts of FIG. 2B, FIG. 4 and FIG. 6.

The RAM 13 is a rewritable volatile memory for temporarily storing various data during various operations of the MFP 10. A retry counter 13a and a WLAN transmission execution flag 13b are formed (stored) in the RAM 13.

The retry counter 13a is used for counting the number of times of consecutive data transmission (transmission of various types of data) by the MFP 10 using a wireless communication method (i.e. the DCL wireless communication 100 or the wireless LAN communication 200). The retry counter 13a is incremented by 1 each time the MFP 10 transmits data by a wireless communication method (DCL wireless communication 100 or wireless LAN communication 200). The retry counter 13a is reset to 0 when the number of times of consecutive data transmission by the MFP 10 by a wireless communication method (DCL wireless communication 100 or wireless LAN communication 200) has reached three and when a data transmission process for transmitting various types of data from the MFP 10 to the handset 50 (see FIG. 6) is started.

The WLAN transmission execution flag 13b is a flag indicating whether or not the MFP 10 has transmitted data by the wireless LAN communication 200. In order to reduce the power consumption of the secondary battery as the power source of the handset 50, the MFP 10 transmitting various types of data to the handset 50 segments the data in units of packets and transmits the segmented packet data by the DCL wireless communication 100 in cases where the amount of the data to be transmitted is less than the threshold value stored in a threshold memory 14a (explained later). In this case, when not all the segmented packet data are received normally by the handset 50 within the total of three times of DCL wireless communication 100, the MFP 10 switches the communication method and thereafter transmits the data by the wireless LAN communication 200. In this case, the WLAN transmission execution flag 13b is set to ON. Thereafter, when the data are not received normally by the handset 50 within the total of three times of wireless LAN communication 200, the MFP 10 executes the transmission of all the packet data again by the total of three times of DCL wireless communication 100. In this case, even when not all the segmented packet data are received normally by the handset 50 within the total of three times of retransmission (DCL wireless communication 100), the MFP 10 cancels the data transmission to the handset 50 without switching the communication method to the wireless LAN communication 200 as long as the WLAN transmission execution flag 13b is already ON. Incidentally, the WLAN transmission execution flag 13b is set to OFF when the data transmission process for transmitting various types of data from the MFP 10 to the handset 50 (see FIG. 6) is started.

The flash memory 14 is a rewritable nonvolatile memory, that is, a memory allowing for the rewriting of data stored therein and capable of retaining the stored data even after the power of the MFP 10 is turned OFF. The aforementioned threshold memory 14a and a data memory 14b are reserved in the flash memory 14.

The threshold memory 14a is used for storing the threshold value which is used for determining whether the data to be communicated should be transmitted by the DCL wireless communication 100 or by the wireless LAN communication 200. When the amount of the data to be communicated is less than the threshold value stored in the threshold memory 14a, the data is segmented in units of packets and the segmented packet data are communicated by the DCL wireless communication 100. On the other hand, when the amount of the data to be communicated is more than or equal to the threshold value stored in the threshold memory 14a, the data is communicated by the wireless LAN communication 200.

The data memory 14b is used for storing various types data communicated. The various types of data stored in the data memory 14b include data received via the DCL wireless communication 100, data received via the wireless LAN communication 200, and data received from an external storage device (unshown) via the storage I/F 20.

The DCL communication control circuit 15 (equipped with the DCL antenna 15a) is a circuit which executes the transmission/reception of digital signals (forming the voice data in the voice communication) while executing the DCL wireless communication 100 with a DCL communication control circuit 55 (equipped with a DCL antenna 55a) of the handset 50.

When the DCL communication control circuit 15 is not executing the transmission/reception of the digital signals forming the voice data, the DCL communication control circuit 15 functions as a circuit for executing the communication (transmission/reception) of the packet data (obtained by segmenting various types of data in units of packets) with the DCL communication control circuit 55 of the handset 50 by the DCL wireless communication 100.

Therefore, the DCL communication control circuit 15 is equipped with not only a transmission/reception circuit but also a modulation circuit for modulating packet data to be transmitted and a demodulation circuit for demodulating received packet data. Incidentally, the packet size (size of a packet as the unit of the data segmentation) has been set to be less than the maximum amount of data that can be transmitted/received by the DCL communication control circuit 15 at a time, by which the DCL communication control circuit 15 is allowed to transmit/receive the packet data normally (ditto for the DCL communication control circuit 55 of the handset 50 which will be explained later).

The WLAN communication control circuit 17 (equipped with the WLAN antenna 17a) is a circuit which executes the wireless LAN communication 200 with a WLAN communication control circuit 56 (equipped with a WLAN antenna 56a) of the handset 50 in conformity with IEEE 802.11b as a WLAN standard. Incidentally, the WLAN communication control circuit 17 carries out the communication by executing the spread spectrum modulation to the data to be communicated.

Therefore, the WLAN communication control circuit 17 is equipped with a spread spectrum modulation circuit for executing the spread spectrum modulation to the various types of data to be transmitted, a power amplifier circuit for amplifying the electric power of the spectrum-spread radio wave, a spread spectrum demodulation circuit for demodulating received spectrum-spread radio wave, etc. Since the WLAN communication control circuit 17 includes such circuits executing more complicated processes and consuming higher electric current (per unit time) compared to the DCL communication control circuit 15, the power consumption (per unit time) of the WLAN communication control circuit 17 is higher than that of the DCL communication control circuit 15.

The LAN I/F 18, which is connected to a LAN (Local Area Network) 400, is an interface for executing data communication with an external device (unshown) connected to the LAN 400. The data received from the external device via the LAN I/F 18 is stored in the data memory 14b.

The oscillator 19 is an active element for outputting an oscillating signal to the BBIC 11.

The storage I/F 20 is an interface for executing data communication with an external storage device (unshown). The data received from the external storage device via the storage I/F 20 is stored in the data memory 14b.

The operation buttons 21 are buttons used for inputting instructions for various operations.

The LCD 22 is a display device for displaying a variety of information (menu, operating status of the MFP 10, etc.) in response to user operations on the operation buttons 21. The user can view necessary information displayed on the LCD 22 by properly operating the operation buttons 21.

The printer 23 is a unit for executing a printing process, in which an image is printed on a sheet fed from a sheet feed cassette (unshown). The MFP 10 implements the print function by controlling the printer 23.

The receiver 24, including a microphone and a speaker, is a device used for the voice communication (conversation).

The voice processing circuit 25 is a circuit for executing the conversion between analog signals and digital signals. The voice processing circuit 25 converts a digital signal received from the handset 50 by the DCL communication control circuit 15 into an analog voice signal and outputs the analog voice signal to the receiver 24 and the NCU 26.

The voice processing circuit 25 converts an analog signal outputted by the receiver 24 in response to voice input or an analog signal received by the NCU 26 from an external telephone set (unshown) via the telephone circuit 500 into a digital signal and outputs the obtained digital signal to the DCL communication control circuit 15. The digital signal (voice data) inputted to the DCL communication control circuit 15 is transmitted to the handset 50 by the DCL wireless communication 100.

The NCU 26, which is connected to the telephone circuit 500, controls the voice communication with an external telephone set (unshown) by transmitting a dialing signal to the telephone circuit 500, responding to a ringing signal from the telephone circuit 500, etc. The MFP 10 implements the fixed-line telephone function by controlling the NCU 26.

Next, the electrical configuration of the handset 50 will be explained. The handset 50 is a device having a DCL (Digital CordLess) telephone function of executing voice communication with the MFP 10 by the DCL wireless communication 100, a data communication function of executing data communication with the MFP 10 by the DCL wireless communication 100, and a WLAN (Wireless LAN) function of executing data communication with the MFP 10 by the wireless LAN communication 200.

As shown in FIG. 1, the handset 50 includes a BBIC 51, a ROM 52, a RAM 53, a flash memory 54, the DCL communication control circuit 55, the DCL antenna 55a, the WLAN communication control circuit 56, the WLAN antenna 56a, an oscillator 57, a storage I/F 58, operation buttons 59, an LCD 60, a receiver 61, a voice processing circuit 62 and a battery 63.

The BBIC 51 includes a conversion circuit, a restoration circuit, a processing circuit and an I/O port. The conversion circuit converts various types of data to be transmitted from the handset 50 (e.g. image data) into data of a format that can be transmitted by the DCL communication control circuit 55 or the WLAN communication control circuit 56. The restoration circuit restores data received from the DCL communication control circuit 55 or the WLAN communication control circuit 56 to data of the original type (e.g. image data). The processing circuit controls components connected to the BBIC 51 according to fixed values and programs stored in the ROM 52 and the RAM 53 and signals communicated via the DCL communication control circuit 55 or the WLAN communication control circuit 56. The I/O port controls signal communication among the components connected to the BBIC 51.

The ROM 52 is a non-rewritable nonvolatile memory storing control programs to be executed by the handset 50, fixed values to be referred to by the control programs, etc. Examples of the control programs are shown in flowcharts of FIG. 2A, FIG. 3 and FIG. 5.

The RAM 53 is a rewritable volatile memory for temporarily storing various data during various operations of the handset 50. A retry counter 53a and a WLAN transmission execution flag 53b are formed (stored) in the RAM 53.

The retry counter 53a is used for counting the number of times of consecutive data transmission (transmission of various types of data) by the handset 50 using a wireless communication method (i.e. the DCL wireless communication 100 or the wireless LAN communication 200). The retry counter 53a is incremented by 1 each time the handset 50 transmits data by a wireless communication method (DCL wireless communication 100 or wireless LAN communication 200). The retry counter 53a is reset to 0 when the number of times of consecutive data transmission by the handset 50 by a wireless communication method (DCL wireless communication 100 or wireless LAN communication 200) has reached three and when a data transmission process for transmitting various types of data from the handset 50 to the MFP 10 (see FIG. 3) is started.

The WLAN transmission execution flag 53b is a flag indicating whether or not the handset 50 has transmitted data by the wireless LAN communication 200. The handset 50 transmitting various types of data to the MFP 10 segments the data in units of packets and transmits the segmented packet data by the DCL wireless communication 100 in cases where the amount of the data to be transmitted is less than the threshold value. In this case, when not all the segmented packet data are received normally by the MFP 10 within the total of three times of DCL wireless communication 100, the handset 50 switches the communication method and thereafter transmits the data by the wireless LAN communication 200. In this case, the WLAN transmission execution flag 53b is set to ON. When the data are not received normally by the MFP 10 within the total of three times of wireless LAN communication 200, the handset 50 executes the transmission of all the packet data again by the total of three times of DCL wireless communication 100. In this case, even when not all the segmented packet data are received normally by the MFP 10 within the total of three times of retransmission (DCL wireless communication 100), the handset 50 cancels the data transmission to the MFP 10 without switching the communication method to the wireless LAN communication 200 as long as the WLAN transmission execution flag 53b is already ON. Incidentally, the WLAN transmission execution flag 53b is set to OFF when the data transmission process for transmitting various types of data from the handset 50 to the MFP 10 (see FIG. 3) is started.

The flash memory 54 is a rewritable nonvolatile memory, that is, a memory allowing for the rewriting of data stored therein and capable of retaining the stored data even after the power of the handset 50 is turned OFF. A data memory 54a is reserved in the flash memory 54.

The data memory 54a is used for storing various types data communicated. The various types of data stored in the data memory 54a include data received via the DCL wireless communication 100, data received via the wireless LAN communication 200, and data received from an external storage device (unshown) via the storage I/F 58.

The DCL communication control circuit 55 (equipped with the DCL antenna 55a) is a circuit which executes the transmission/reception of digital signals (forming the voice data in the voice communication) while executing the DCL wireless communication 100 with the DCL communication control circuit 15 of the MFP 10.

When the DCL communication control circuit 55 is not executing the transmission/reception of the digital signals forming the voice data, the DCL communication control circuit 55 functions as a circuit for executing the communication (transmission/reception) of the packet data (obtained by segmenting various types of data in units of packets) with the DCL communication control circuit 15 of the MFP 10 by the DCL wireless communication 100.

Therefore, the DCL communication control circuit 55 is equipped with not only a transmission/reception circuit but also a modulation circuit for modulating packet data to be transmitted and a demodulation circuit for demodulating received packet data similarly to the DCL communication control circuit 15 of the MFP 10.

The WLAN communication control circuit 56 (equipped with the WLAN antenna 56a) is a circuit which executes the wireless LAN communication 200 with the WLAN communication control circuit 17 of the MFP 10 in conformity with IEEE 802.11b (WLAN standard). Incidentally, the WLAN communication control circuit 56 carries out the communication by executing the spread spectrum modulation to the data to be communicated.

Therefore, similarly to the WLAN communication control circuit 17 of the MFP 10, the WLAN communication control circuit 56 is equipped with a spread spectrum modulation circuit for executing the spread spectrum modulation to the various types of data to be transmitted, a power amplifier circuit for amplifying the electric power of the spectrum-spread radio wave, a spread spectrum demodulation circuit for demodulating received spectrum-spread radio wave, etc. Since the WLAN communication control circuit 56 includes such circuits executing more complicated processes and consuming higher electric current (per unit time) compared to the DCL communication control circuit 55, the power consumption (per unit time) of the WLAN communication control circuit 56 is higher than that of the DCL communication control circuit 55.

The oscillator 57 is an active element for outputting an oscillating signal to the BBIC 51.

The storage I/F 58 is an interface for executing data communication with an external storage device (unshown). The data received from the external storage device via the storage I/F 58 is stored in the data memory 54a.

The operation buttons 59 are buttons used for inputting instructions for various operations.

The LCD 60 is a display device for displaying a variety of information (menu, operating status of the handset 50, etc.) in response to user operations on the operation buttons 59. The user can view necessary information displayed on the LCD 60 by properly operating the operation buttons 59.

The receiver 61, including a microphone and a speaker, is a device (unit) used for the voice communication (conversation).

The voice processing circuit 62 is a circuit for executing the conversion between analog signals and digital signals. The voice processing circuit 62 converts a digital signal received from the MFP 10 by the DCL communication control circuit 55 into an analog voice signal and outputs the analog voice signal to the receiver 61.

The voice processing circuit 62 converts an analog signal outputted by the receiver 61 in response to voice input into a digital signal (voice data) and outputs the obtained digital signal to the DCL communication control circuit 55. The digital signal (voice data) inputted to the DCL communication control circuit 55 is transmitted to the MFP 10 by the DCL wireless communication 100.

The battery 63 is a secondary battery which supplies electric power to the components (DCL communication control circuit 55, WLAN communication control circuit 56, etc.) of the handset 50. The charging of the battery 63 is started when the handset 50 is set on a charger (unshown) and ended when the handset 50 is removed from the charger.

Figure 2:
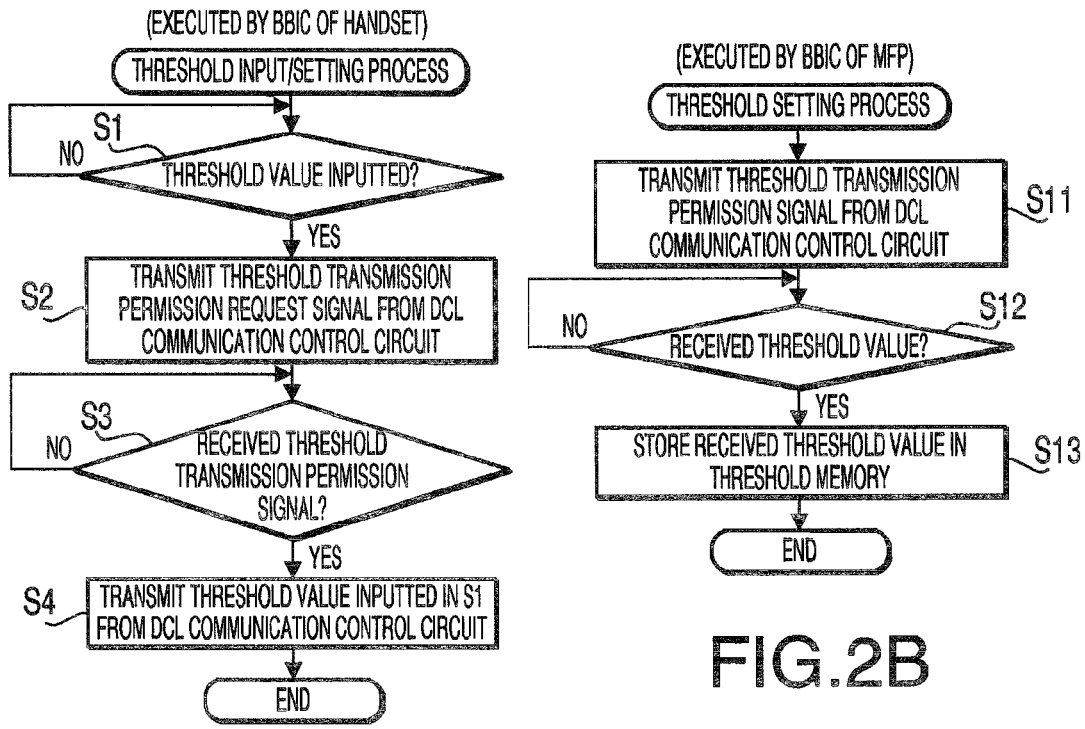
FIG. 2A is a flowchart showing a threshold input/setting process which is executed by a BBIC of a handset included in the wireless communication system.
FIG. 2B is a flowchart showing a threshold setting process which is executed by a BBIC of an MFP (Multi Function Peripheral) included in the wireless communication system.
FIG. 2C is a table showing the relationship between a threshold value stored in a threshold memory and available time (remaining life) of a battery of the handset.

In the following, a threshold input/setting process which is executed by the handset 50, a threshold setting process which is executed by the MFP 10, and the relationship between the threshold value and the battery 63 will be explained referring to FIGS. 2A, 2B and 2C.

First, the threshold input/setting process shown in FIG. 2A will be explained. The threshold input/setting process, for the input of the threshold value to be stored in the threshold memory 14a of the MFP 10, is executed by the BBIC 51 of the handset 50 when a threshold input instruction is issued by the user through the operation buttons 59 of the handset 50.

In the threshold input/setting process, the BBIC 51 first judges whether the threshold value to be stored in the threshold memory 14a has been inputted through the operation buttons 59 (S1). If the threshold value has not been inputted yet (S1: NO), the step S1 is repeated until the threshold value is inputted. If the threshold value has been inputted (S1: YES), the BBIC 51 transmits a threshold transmission permission request signal (requesting threshold transmission permission from the MFP 10) to the MFP 10 using the DCL communication control circuit 55 (S2).

Subsequently, the BBIC 51 judges whether a threshold transmission permission signal (permitting the transmission of the threshold value to the MFP 10) has been received by the DCL communication control circuit 55 (S3). If the threshold transmission permission signal has not been received yet (S3: NO), the step S3 is repeated until the threshold transmission permission signal is received. If the threshold transmission permission signal has been received (S3: YES), the BBIC 51 transmits the threshold value inputted in S1 to the MFP 10 using the DCL communication control circuit 15 (S4) and ends the threshold input/setting process.

Next, the threshold setting process shown in FIG. 2B will be explained. The threshold setting process, for storing the threshold value transmitted from the handset 50 in the threshold memory 14a, is executed by the BBIC 11 of the MFP 10 when the threshold transmission permission request signal from the handset 50 is received by the DCL communication control circuit 15.

In the threshold setting process, the BBIC 11 first transmits the threshold transmission permission signal to the handset 50 using the DCL communication control circuit 15 (S11). Subsequently, the BBIC 11 judges whether the threshold value from the handset 50 has been received by the DCL communication control circuit 15 (S12). If the threshold value has not been received yet (S12: NO), the step S12 is repeated until the threshold value is received. If the threshold value has been received (S12: YES), the BBIC 11 stores the received threshold value in the threshold memory 14a (S13) and ends the threshold setting process.

As above, by the threshold input/setting process (FIG. 2A) and the threshold setting process (FIG. 2B), the threshold value can be set arbitrarily by the user through the operation buttons 59 of the handset 50 and stored in the threshold memory 14a.

Next, the relationship between the threshold value stored in the threshold memory 14a and the available time of the battery 63 will be explained referring to FIG. 2C. The table of FIG. 2C includes two items: the threshold value stored in the threshold memory 14a and the available time of the battery 63. Incidentally, the available time of the battery 63 is a rough estimate. While the threshold value stored in the threshold memory 14a can be set arbitrarily as mentioned above, four typical examples: 384 kbps, 256 kbps, 128 kbps and 64 kbps are shown here. Further, a case where various types of data are transmitted by exclusively using the wireless LAN communication 200 and a case where only voice communication (conversation) is executed with no data transmission (transmission of various types of data) by the DCL wireless communication 100 are also shown for reference. The available time of the battery 63 is expressed in two ways (maximum available time, minimum available time) since electric power consumption of the battery 63 changes depending on the number of times of data transmission/reception.

For example, when the threshold value has been set at 384 kbps in the threshold memory 14a, the DCL wireless communication 100 is used (i.e. packet data are communicated using the DCL communication control circuits 15 and 55) if the amount of the data to be communicated is less than 384 kbps. On the other hand, if the amount of the data to be communicated is 384 kbps or more, the wireless LAN communication 200 is used, that is, the data is communicated using the WLAN communication control circuits 17 and 56.

First, the case where various types of data are transmitted by exclusively using the wireless LAN communication 200 will be explained. In this case, the consumption of the battery 63 hits the maximum since only the WLAN communication control circuit 56 (high electric power consumption) is used in the handset 50 for the data communication. Thus, both the minimum available time (2.1 h) and the maximum available time (4.2 h) in this case are the shortest among the six cases.

On the other hand, in the case where only voice communication is executed using the DCL wireless communication 100, the consumption of the battery 63 hits the minimum since only the DCL communication control circuit 55 (low electric power consumption) is used in the handset 50. Thus, the maximum available time (7.0 h) in this case is the longest among the six cases. Incidentally, the minimum available time does not exist in this case since the data communication using the DCL communication control circuit 55 is not executed in this case as mentioned above.

Next, when the threshold value has been set at 64 kbps in the threshold memory 14a, the DCL communication control circuit 55 is used in the handset 50 if the amount of the data to be communicated is less than 64 kbps, by which the consumption of the battery 63 is reduced compared to the case where the wireless LAN communication 200 is exclusively used, by which both the minimum available time and the maximum available time are increased to 4.2 h and 5.6 h, respectively.

Similarly, as the threshold value stored in the threshold memory 14a increases, the maximum available time increases due to the increase in the usage rate of the DCL communication control circuit 55 in the handset 50 for data communication. For example, in the case where the threshold value in the threshold memory 14a is 384 kbps, the DCL communication control circuit 55 is used in the handset 50 when the amount of the data to be communicated is less than 384 kbps as mentioned above (higher usage rate of the DCL communication control circuit 55 compared to the case where the threshold value is 64 kbps), by which the maximum available time is increased by 1.3 h compared to the case where the threshold value is 64 kbps.

As explained above referring to FIG. 2C, by increasing the threshold value stored in the threshold memory 14a, the use (consumption) of the battery 63 can be reduced since the handset 50 executing data communication (communication of various types of data) transmits the data (packet data) using the DCL communication control circuit 55 (low electric power consumption) a lot.

Incidentally, the threshold value to be stored in the threshold memory 14a can be inputted by operating the operation buttons 59 of the handset 50 as mentioned above referring to FIGS. 2A and 2B. Thus, the user can set a desired threshold value while checking the battery consumption of the handset 50. In other words, the user can determine whether to transmit various types of data by using the DCL communication control circuit 55 a lot or by using the WLAN communication control circuit 56 a lot while checking the battery consumption of the handset 50.

Figure 3:
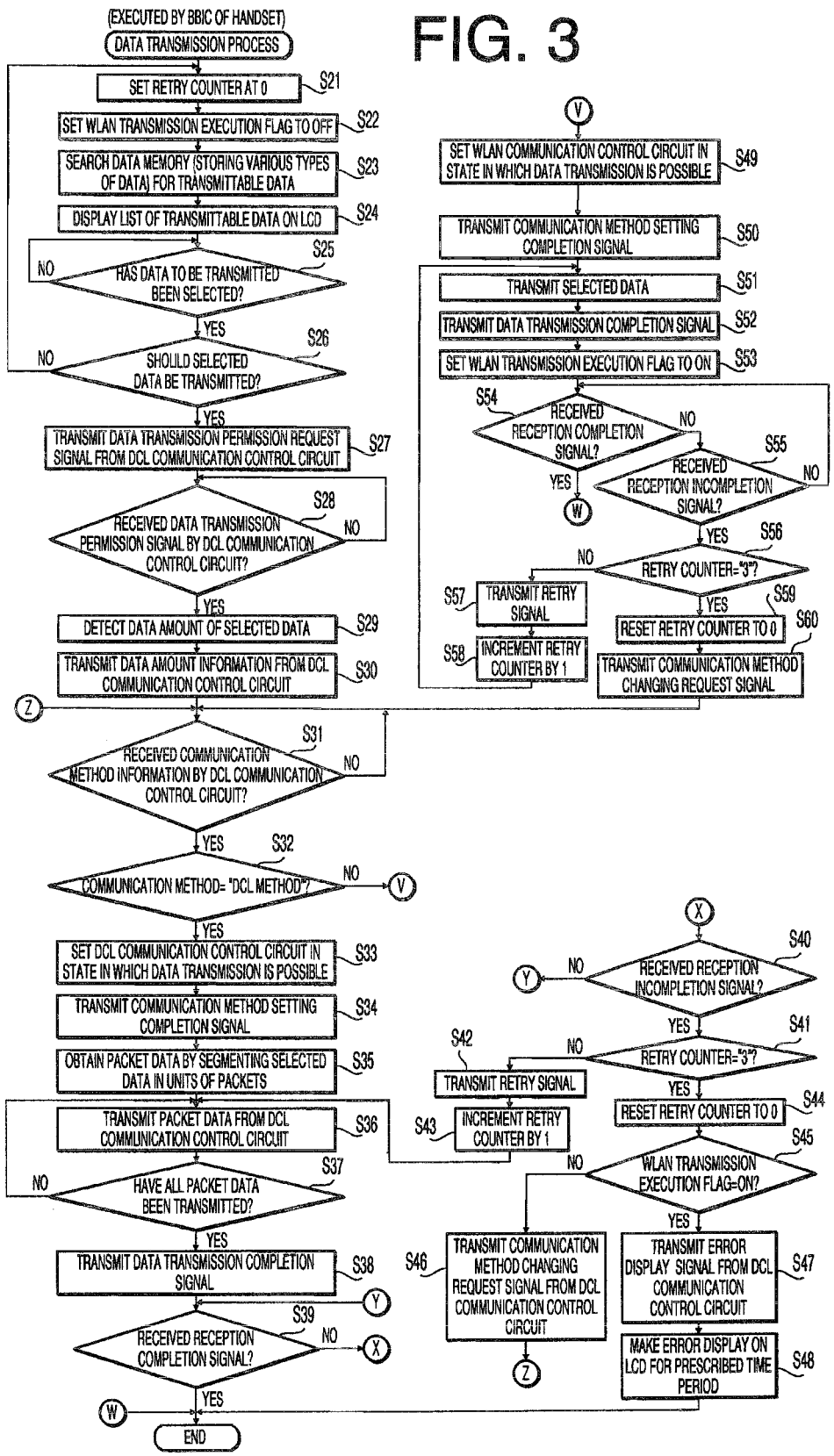
FIG. 3 is a flowchart showing a data transmission process which is executed by the BBIC of the handset.

Next, the data transmission process executed by the handset 50 will be explained referring to FIG. 3. The data transmission process (FIG. 3), for transmitting various types of data stored in the data memory 54a of the handset 50 to the MFP 10, is executed when a data transmission instruction is issued by the user through the operation buttons 59 of the handset 50.

In the data transmission process (FIG. 3), the BBIC 51 first sets the retry counter 53a at 0 (S21) and sets the WLAN transmission execution flag 53b to OFF (S22), by which initial setting is completed.

Subsequently, the BBIC 51 searches the data memory 54a (storing various types of data) for data that can be transmitted (S23), displays a list of the transmittable data on the LCD 60 (S24), and thereafter judges whether data to be transmitted has been selected by the user through the operation buttons 59 (S25). If no data to be transmitted has been selected (S25: NO), the step S25 is repeated until data to be transmitted is selected.

On the other hand, if data to be transmitted has been selected (S25: YES), the BBIC 51 judges whether the selected data should be transmitted (S26). For example, the BBIC 51 prompts the user to select whether to transmit the selected data through the operation buttons 59 by displaying a message "TRANSMIT SELECTED DATA?" on the LCD 60, for example.

If the selected data should not be transmitted (S26: NO), the BBIC 51 returns to the step S21. If the selected data should be transmitted (S26: YES), the BBIC 51 transmits a data transmission permission request signal (requesting data transmission permission (permitting the transmission of the selected data) from the MFP 10) to the MFP 10 using the DCL communication control circuit 55 (S27). Subsequently, the BBIC 51 judges whether a data transmission permission signal (permitting the transmission of the selected data) has been received by the DCL communication control circuit 55 (S28). If the data transmission permission signal has not been received yet (S28: NO), the step S28 is repeated until the data transmission permission signal is received. If the data transmission permission signal has been received (S28: YES), the BBIC 51 advances to step S29.

In the step S29, the BBIC 51 detects the data amount of the selected data (S29). Subsequently, the BBIC 51 transmits data amount information (indicating the detected data amount) to the MFP 10 using the DCL communication control circuit 55 (S30). Incidentally, the MFP 10 receiving the data amount information compares the data amount with the threshold value stored in the threshold memory 14a. If the data amount is less than the threshold value, the MFP 10 determines the data communication method of the handset 50 as a "DCL method" (transmitting data using the DCL communication control circuit 55). On the other hand, if the data amount is the threshold value or more, the MFP 10 determines the data communication method of the handset 50 as a "WLAN method" (transmitting data using the WLAN communication control circuit 56).

After transmitting the data amount information (S30), the BBIC 51 judges whether or not communication method information representing the "DCL method" or the "WLAN method" has been received by the DCL communication control circuit 55 (S31). If the communication method information has not been received yet (S31: NO), the step S31 is repeated until the communication method information is received. If the communication method information has been received (S31: YES), the BBIC 51 judges whether the communication method represented by the communication method information is the "DCL method" or not (S32).

If the communication method represented by the communication method information is the "DCL method" (S32: YES), the BBIC 51 advances to steps S33-S48 (data transmission by the DCL method). In the steps S33-S48, transmission of data and various signals is executed exclusively using the DCL communication control circuit 55, by which the use of the WLAN communication control circuit 56 can be reduced and the consumption of the battery 63 of the handset 50 can be slowed down.

If the communication method represented by the communication method information is not the "DCL method", that is, if the communication method is the "WLAN method" (S32: NO), the BBIC 51 advances to steps S49-S60 (data transmission by the WLAN method). In the steps S49-S60, transmission of data and various signals is executed exclusively using the WLAN communication control circuit 56.

When the communication method represented by the communication method information is the "DCL method" in S32 (S32: YES), the BBIC 51 sets the DCL communication control circuit 55 in a state in which data transmission is possible, that is, switches circuits inside the DCL communication control circuit 55 from a standby state to an operating state (S33) and thereafter transmits a communication method setting completion signal (indicating that the setting of the communication method has been completed) to the MFP 10 (S34).

Subsequently, the BBIC 51 obtains the packet data by segmenting the selected data in units of packets (S35), transmits the packet data to the MFP 10 using the DCL communication control circuit 55 (S36), and thereafter judges whether all the packet data have been transmitted or not (S37). If the transmission of all the packet data has not been completed yet (S37: NO), the BBIC 51 returns to the step S36. If the transmission of all the packet data has been completed (S37: YES), the BBIC 51 transmits a data transmission completion signal (indicating that the data transmission has been completed) to the MFP 10 (S38).

Subsequently, the BBIC 51 judges whether a reception completion signal (indicating that all the transmitted packet data have been received normally by the MFP 10) has been received (S39). If the reception completion signal has been received (S39: YES), the BBIC 51 (recognizing that all the packet data have been received normally by the MFP 10) ends the data transmission process (FIG. 3). If the reception completion signal has not been received yet (S39: NO), the BBIC 51 judges whether a reception incompletion signal (indicating that the MFP 10 has not received all the transmitted packet data) has been received (S40).

If the reception incompletion signal has not been received in S40 (S40: NO), the BBIC 51 returns to the step S39. As above, the steps S39 and S40 are repeated until the reception completion signal or the reception incompletion signal is received. If the reception incompletion signal has been received (S40: YES), the BBIC 51 judges whether the retry counter 53a is at "3", that is, whether the transmission of all the packet data has been executed three times consecutively (S41).

If the retry counter 53a is not at "3" (S41: NO), the BBIC 51 transmits a retry signal (indicating that all the packet data will be transmitted again) to the MFP 10 (S42), increments the retry counter 53a by 1 (S43), and returns to the step S36. Incidentally, the MFP 10 receiving the retry signal recognizes that the packet data will be retransmitted from the handset 50.

If the retry counter 53a is at "3" in S41 (S41: YES), it means that the transmission of all the packet data by the DCL method has been executed three times consecutively. In this case, the BBIC 51 resets the retry counter 53a to 0 (S44) and advances to a process from step S45 (in which the communication method is switched to the WLAN method or a transmission error message is displayed). In the step S45, the BBIC 51 judges whether the WLAN transmission execution flag 53b is ON. If the WLAN transmission execution flag 53b is OFF (S45: NO), the BBIC 51 (recognizing that the data have not been transmitted by the WLAN method) transmits a communication method changing request signal (requesting the changing of the communication method) to the MFP 10 using the DCL communication control circuit 55 (S46) and thereafter returns to the step S31. Incidentally, the MFP 10 receiving the communication method changing request signal transmits communication method information (indicating that the communication method is changed from the DCL method to the WLAN method) to the handset 50.

On the other hand, if the WLAN transmission execution flag 53b is ON (S45: YES), it means that the data has already been transmitted by the WLAN method and thereafter the transmission of all the packet data by the DCL method has already been executed three times. In this case, in order to stop further data transmission, the BBIC 51 transmits an error display signal (indicating that a transmission error has occurred) using the DCL communication control circuit 55 (S47), makes an error display on the LCD 60 for a prescribed time period (e.g. 5 seconds) (S48), and ends the data transmission process (FIG. 3).

When the communication method represented by the communication method information is not the DCL method, that is, the WLAN method in S32 (S32: NO), the BBIC 51 sets the WLAN communication control circuit 56 in the state in which data transmission is possible, that is, switches circuits inside the WLAN communication control circuit 56 from the standby state to the operating state (S49) and thereafter transmits the communication method setting completion signal (indicating that the setting of the communication method has been completed) to the MFP 10 (S50).

Subsequently, the BBIC 51 transmits the selected data to the MFP 10 using the WLAN communication control circuit 56 (S51), transmits the data transmission completion signal to the MFP 10 (S52), and sets the WLAN transmission execution flag 53b to ON (S53). Subsequently, the BBIC 51 judges whether or not either the reception completion signal or the reception incompletion signal has been received (S54, S55). If the reception completion signal has been received (S54: YES), the BBIC 51 (recognizing that the data has been received normally by the MFP 10) ends the data transmission process (FIG. 3). If the reception incompletion signal has been received (S55: YES), the BBIC 51 (recognizing that the data has not been received normally by the MFP 10) judges whether the retry counter 53a is at "3", that is, whether the transmission of the data by the WLAN method has already been executed three times consecutively (S56). If the retry counter 53a is not at "3" (S56: NO), the BBIC 51 transmits the retry signal (indicating that the data will be transmitted again) to the MFP 10 (S57), increments the retry counter 53a by 1 (S58), and returns to the step S51.

If the retry counter 53a is at "3" in S56 (S56: YES), the BBIC 51 (recognizing that the transmission of the data by the WLAN method has already been executed three times consecutively) resets the retry counter 53a to 0 (S59), transmits the communication method changing request signal (requesting the changing of the communication method) to the MFP 10 (S60) and thereafter returns to the step S31. Incidentally, the MFP 10 receiving the communication method changing request signal transmits communication method information (indicating the communication method is changed from the WLAN method to the DCL method) to the handset 50.

As above, in the data transmission process executed by the BBIC 51 of the handset 50 (FIG. 3), when the amount of the data to be transmitted from the handset 50 to the MFP 10 is less than the threshold value stored in the threshold memory 14a, the handset 50 (BBIC 51) segments the data in units of packets and transmits all the segmented packet data to the MFP 10 using the DCL communication control circuit 55 (consuming less electric current (per unit time) compared to the WLAN communication control circuit 56) without using the WLAN communication control circuit 56. Thus, the electric power consumption (electric current consumption) can be reduced compared to the case where the data transmission from the handset 50 to the MFP 10 is executed exclusively using the WLAN communication control circuit 56, by which the consumption of the battery 63 supplying electric power to the whole handset 50 can be reduced.

Further, in the data transmission process (FIG. 3), the WLAN communication control circuit 56 is used for the transmission of various types of data to the MFP 10 only when not all the packet data are successfully received by the MFP 10, which makes it possible to make the MFP 10 receive the data reliably while also reducing the consumption of the battery 63 through the reduction of the use of the WLAN communication control circuit 56.

Figure 4:
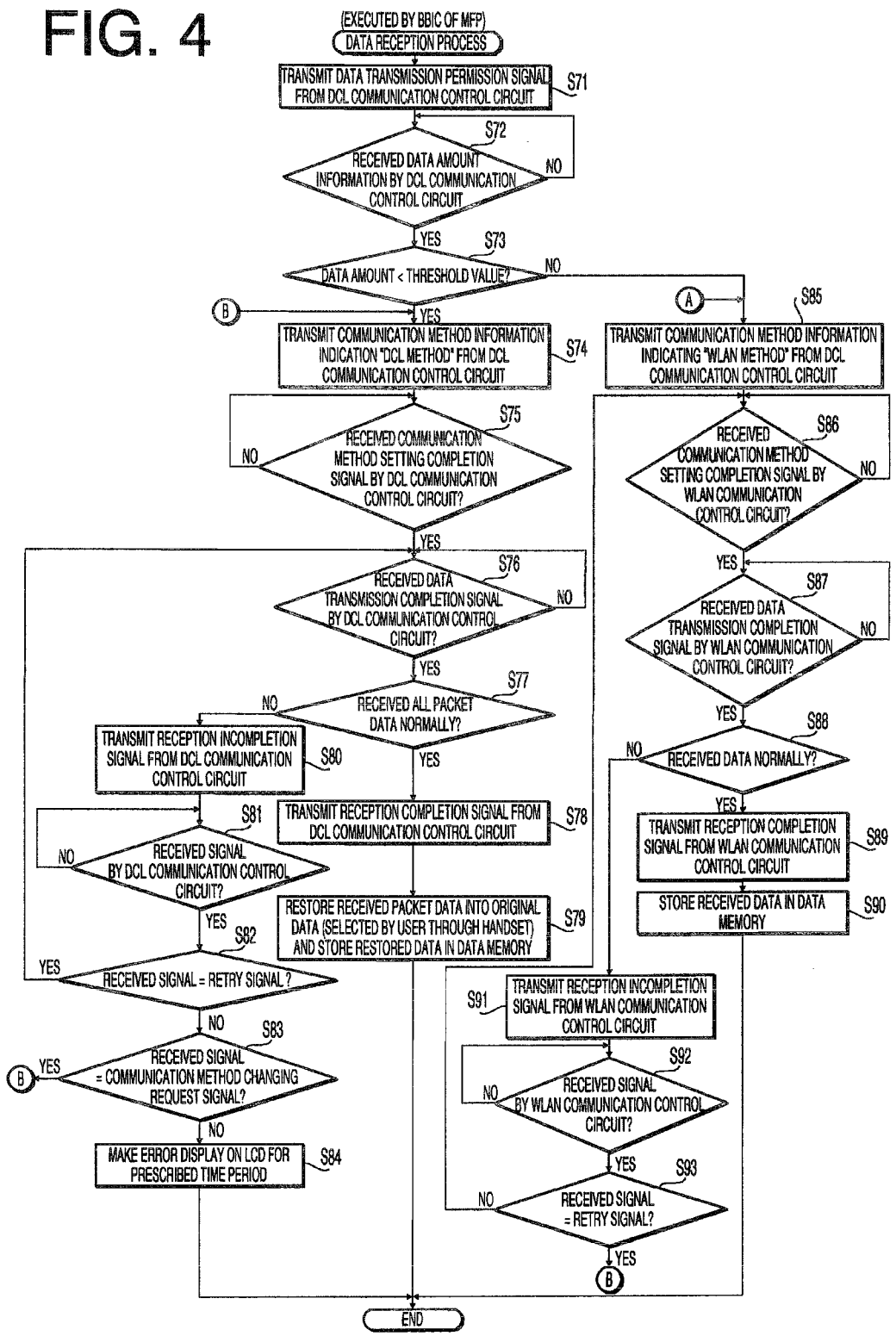
FIG. 4 is a flowchart showing a data reception process which is executed by the BBIC of the MFP.

Next, a data reception process executed by the MFP 10 will be explained referring to FIG. 4. The data reception process (FIG. 4), for determining the communication method depending on the amount of data transmitted from the handset 50 and thereafter receiving the data from the handset 50, is executed when the data transmission permission request signal from the handset 50 is received by the DCL communication control circuit 15.

In the data reception process (FIG. 4), the BBIC 11 first transmits the data transmission permission signal (permitting the data transmission from the handset 50) using the DCL communication control circuit 15 (S71) and thereafter judges whether the data amount information transmitted from the handset 50 has been received by the DCL communication control circuit 15 (S72). If the data amount information has not been received yet (S72: NO), the step S72 is repeated until the data amount information is received. If the data amount information has been received (S72: YES), the BBIC 11 judges whether the data amount indicated by the received data amount information is less than the threshold value stored in the threshold memory 14a (S73).

If the data amount is less than the threshold value (S73: YES), the BBIC 11 transmits the communication method information indicating that the communication method to be used is the DCL method to the handset 50 using the DCL communication control circuit 15 (S74) and thereafter judges whether the communication method setting completion signal transmitted from the handset 50 in response to the communication method information has been received by the DCL communication control circuit 15 (S75).

If the communication method setting completion signal has not been received yet (S75: NO), the step S75 is repeated until the communication method setting completion signal is received. If the communication method setting completion signal has been received (S75: YES), the packet data transmission from the handset 50 is started after a while. In this case (S75: YES), the BBIC 11 judges whether the data transmission completion signal (indicating that the transmission of all the packet data by the handset 50 has been completed) has been received by the DCL communication control circuit 15 (S76). If the data transmission completion signal has not been received yet (S76: NO), the step S76 is repeated until the data transmission completion signal is received. If the data transmission completion signal has been received (S76: YES), the BBIC 11 judges whether all the packet data transmitted from the handset 50 have successfully been received normally (S77).

If all the packet data have successfully been received normally (S77: YES), the BBIC 11 transmits the reception completion signal to the handset 50 using the DCL communication control circuit 15 (S78). Thereafter, the BBIC 11 restores the received packet data into the original data (selected by the user through the handset 50), stores the restored data in the data memory 14b (S79), and ends the data reception process (FIG. 4).

If not all the packet data have been received normally (S77: NO), the BBIC 11 transmits the reception incompletion signal to the handset 50 using the DCL communication control circuit 15 (S80). Incidentally, the handset 50 receiving the reception incompletion signal sends back the retry signal, the communication method changing request signal or the error display signal as mentioned above (see S42, S46 and S47 in FIG. 3). Thus, the BBIC 11 after transmitting the reception incompletion signal (S80) judges whether any one of the retry signal, the communication method changing request signal and the error display signal has been received by the DCL communication control circuit 15(S81). If none of the signals has been received yet (S81: NO), the step S81 is repeated until any one of the signals is received. If any one of the signals has been received (S81: YES), the BBIC 11 judges whether the received signal is the retry signal (S82).

If the received signal is the retry signal (S82: YES), the BBIC 11 returns to the step S76 and receives the packet data retransmitted from the handset 50. If the received signal is not the retry signal (S82: NO), the BBIC 11 judges whether the received signal is the communication method changing request signal (S83). If the received signal is the communication method changing request signal (S83: YES), the BBIC 11 advances to a process from step S85 for changing the communication method to the WLAN method. If the received signal is not the communication method changing request signal (S83: NO), the BBIC 11 (recognizing that the received signal is the error display signal) makes the error display on the LCD 22 for a prescribed time period (e.g. 5 seconds) (S84) and thereafter ends the data reception process (FIG. 4).

If the data amount indicated by the received data amount information is the threshold value or more in S73 (S73: NO), the BBIC 11 transmits the communication method information indicating that the communication method to be used is the WLAN method to the handset 50 using the DCL communication control circuit 15 (S85) and thereafter judges whether the communication method setting completion signal transmitted from the handset 50 in response to the communication method information has been received by the WLAN communication control circuit 17 (S86).

If the communication method setting completion signal has not been received yet (S86: NO), the step S86 is repeated until the communication method setting completion signal is received. If the communication method setting completion signal has been received (S86: YES), the transmission of the selected data from the handset 50 is started after a while. In this case (S86: YES), the BBIC 11 judges whether the data transmission completion signal (indicating that the data transmission by the handset 50 has been completed) has been received by the WLAN communication control circuit 17 (S87). If the data transmission completion signal has not been received yet (S87: NO), the step S87 is repeated until the data transmission completion signal is received. If the data transmission completion signal has been received (S87: YES), the BBIC 11 judges whether the data has successfully been received normally (S88).

If the data has successfully been received normally (S88: YES), the BBIC 11 transmits the reception completion signal using the WLAN communication control circuit 17 (S89), stores the received data in the data memory 14b (S90), and ends the data reception process (FIG. 4).

If the data has not been received normally (S88: NO), the BBIC 11 transmits the reception incompletion signal using the WLAN communication control circuit 17 (S91). Incidentally, the handset 50 receiving the reception incompletion signal sends back the retry signal or the communication method changing request signal as mentioned above (see S57 and S60 in FIG. 3). Thus, the BBIC 11 after transmitting the reception incompletion signal (S91) judges whether or not either the retry signal or the communication method changing request signal has been received by the WLAN communication control circuit 17 (S92). If neither of the signals has been received yet (S92: NO), the step S92 is repeated until either of the signals is received. If either of the signals has been received (S92: YES), the BBIC 11 judges whether the received signal is the retry signal (S93).

If the received signal is the retry signal (S93: YES), the BBIC 11 returns to the step S87 and receives the data retransmitted from the handset 50. If the received signal is not the retry signal (S93: NO), the BBIC 11 (recognizing that the received signal is the communication method changing request signal) advances to the process from the step S74 for changing the communication method to the DCL method again.

As above, in the data reception process which is executed by the BBIC 11 of the MFP 10 (FIG. 4) when data is transmitted from the handset 50 to the MFP 10, the MFP 10 receives the data amount information from the handset 50 and determines the communication method as the DCL method or the WLAN method depending on the data amount indicated by the data amount information.

The data reception process (FIG. 4) is ended when all the packet data (or data) have successfully been received by the MFP 10 except when the error display is made. Therefore, the MFP 10 can receive all the packet data (or data) from the handset 50 reliably.

Figure 5:
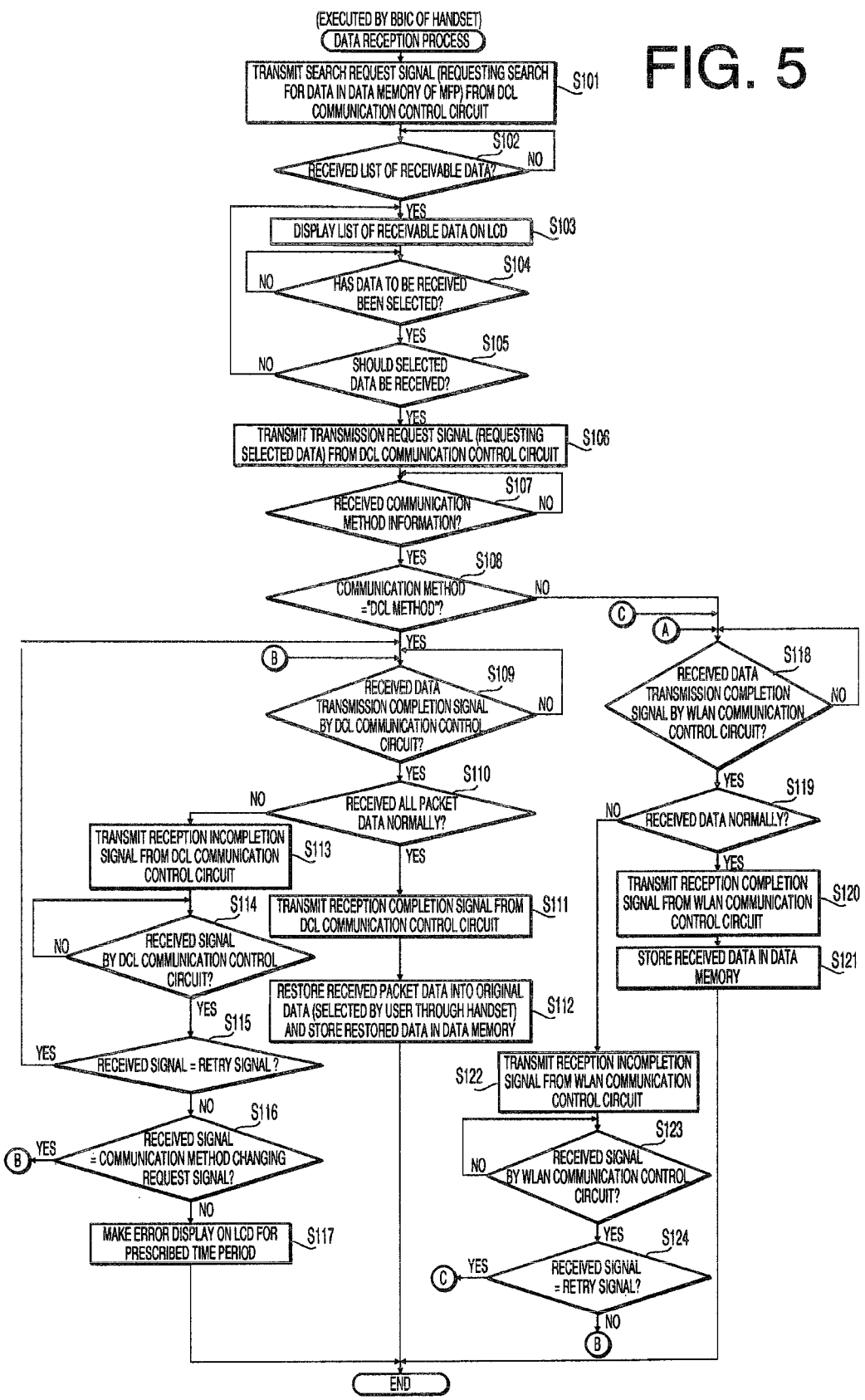
FIG. 5 is a flowchart showing a data reception process which is executed by the BBIC of the handset.

Next, a data reception process executed by the handset 50 will be explained referring to FIG. 5. The data reception process (FIG. 5), for letting the user select desired data (that the user wants the handset 50 to receive) from the various types of data stored in the data memory 14*b* of the MFP 10 and receiving the selected data, is executed when a data reception instruction (for receiving desired data) is issued by the user through the operation buttons 59 of the handset 50.

In the data reception process (FIG. 5), the BBIC 51 first transmits a search request signal (requesting a search for data stored in the data memory 14*b* of the MFP 10) using the DCL communication control circuit 55 (S101). Incidentally, the MFP 10 receiving the search request signal sends back a list of data stored in the data memory 14*b* that can be received by the handset 50.

After transmitting the search request signal (S101), the BBIC 51 judges whether the list of receivable data has been received (S102). If the list has not been received yet (S102: NO), the step S102 is repeated until the list is received. If the list has been received (S102: YES), the BBIC 51 displays the list of receivable data on the LCD 60 (S103). Subsequently, the BBIC 51 judges whether data to be received has been selected by the user through the operation buttons 59 (S104). If the data to be received has not been selected yet (S104: NO), the step S104 is repeated until the data selection is made.

If the data to be received has been selected (S104: YES), the BBIC 51 judges whether the selected data should be received (S105). For example, the BBIC 51 prompts the user to select whether to receive the selected data through the operation buttons 59 by displaying a message "RECEIVE SELECTED DATA?" on the LCD 60, for example.

If the selected data should not be received (S105: NO), the BBIC 51 returns to the step S103. If the selected data should be received (S105: YES), the BBIC 51 transmits a transmission request signal (requesting the MFP 10 to transmit the selected data) to the MFP 10 using the DCL communication control circuit 55 (S106). Incidentally, the MFP 10 receiving the transmission request signal judges whether the amount of the requested data is less than the threshold value stored in the threshold memory 14*a*. The MFP 10 determines the communication method as the "DCL method" if the data amount is less than the threshold value, while determining the communication method as the "WLAN method" if the data amount is the threshold value or more.

After transmitting the transmission request signal (S106), the BBIC 51 judges whether the communication method information (representing the "DCL method" or the "WLAN method") has been received by the DCL communication control circuit 55 (S107). If the communication method information has not been received yet (S107: NO), the step S107 is repeated until the communication method information is received. If the communication method information has been received (S107: YES), the BBIC 51 judges whether the communication method represented by the communication method information is the "DCL method" or not (S108).

If the communication method represented by the communication method information is the "DCL method" (S108: YES), the transmission of the packet data from the MFP 10 is started after a while. In this case (S108: YES), the BBIC 51 judges whether the data transmission completion signal (indicating that the packet data transmission by the MFP 10 has been completed) has been received by the DCL communication control circuit 55 (S109). If the data transmission completion signal has not been received yet (S109: NO), the step S109 is repeated until the data transmission completion signal is received. If the data transmission completion signal has been received (S109: YES), the BBIC 51 judges whether all the packet data have successfully been received normally (S110).

If all the packet data have successfully been received normally (S110: YES), the BBIC 51 transmits the reception completion signal using the DCL communication control circuit 55 (S111), restores the received packet data into the original data (selected by the user through the handset 50), stores the restored data in the data memory 54*a* (S112), and ends the data reception process (FIG. 5).

If not all the packet data have been received normally (S110: NO), the BBIC 51 transmits the reception incompletion signal to the MFP 10 using the DCL communication control circuit 55 (S113). Incidentally, the MFP 10 receiving the reception incompletion signal sends back the retry signal, the communication method changing request signal or the error display signal as will be explained later referring to FIG. 6. Thus, the BBIC 51 after transmitting the reception incompletion signal (S113) judges whether any one of the retry signal, the communication method changing request signal and the error display signal has been received by the DCL communication control circuit 15 (S114). If none of the signals has been received yet (S114: NO), the step S114 is repeated until any one of the signals is received. If any one of the signals has been received (S114: YES), the BBIC 51 judges whether the received signal is the retry signal (S115).

If the received signal is the retry signal (S115: YES), the BBIC 51 returns to the step S109 and receives the packet data retransmitted from the MFP 10. If the received signal is not the retry signal (S115: NO), the BBIC 51 judges whether the received signal is the communication method changing request signal (S116). If the received signal is the communication method changing request signal (S116: YES), the transmission of the selected data from the MFP 10 by the WLAN method (instead of the DCL method) is started after a while. In this case (S116: YES), the BBIC 51 advances to step S118 to judge whether the data transmission completion signal (indicating that the data transmission by the MFP 10 has been completed) has been received by the WLAN communication control circuit 56. On the other hand, if the received signal is not the communication method changing request signal (S116: NO), the BBIC 51 (recognizing that the received signal is the error display signal) makes the error display on the LCD 60 for a prescribed time period (e.g. 5 seconds) (S117) and thereafter ends the data reception process (FIG. 5).

If the communication method represented by the communication method information is the "WLAN method" in S108 (S108: NO), the transmission of the data from the MFP 10 by the WLAN method is started after a while. In this case (S108: NO), the BBIC 51 advances to the step S118 to judge whether the data transmission completion signal (indicating that the data transmission by the MFP 10 has been completed) has been received by the WLAN communication control circuit 56.

If the data transmission completion signal has not been received yet (S118: NO), the step S118 is repeated until the data transmission completion signal is received. If the data transmission completion signal has been received (S118: YES), the BBIC 51 judges whether the data has successfully been received normally (S119).

If the data has successfully been received normally (S119: YES), the BBIC 51 transmits the reception completion signal using the WLAN communication control circuit 56 (S120), stores the received data in the data memory 54*a* (S121), and ends the data reception process (FIG. 5).

If the data has not been received normally (S119: NO), the BBIC 51 transmits the reception incompletion signal to the MFP 10 using the WLAN communication control circuit 56 (S122). Incidentally, the MFP 10 receiving the reception incompletion signal sends back the retry signal or the communication method changing request signal as will be explained later referring to FIG. 6. Thus, the BBIC 51 after transmitting the reception incompletion signal (S122) judges whether either the retry signal or the communication method changing request signal has been received by the WLAN communication control circuit 56 (S123). If neither of the signals has been received yet (S123: NO), the step S123 is repeated until either of the signals is received. If either of the signals has been received (S123: YES), the BBIC 51 judges whether the received signal is the retry signal (S124).

If the received signal is the retry signal (S124: YES), the BBIC 51 returns to the step S118 and receives the data retransmitted from the MFP 10. If the received signal is not the retry signal, that is, the communication method changing request signal (S124: NO), retransmission of the selected data (in the form of packet data) from the MFP 10 by the DCL method is started after a while. In this case (S124: NO), the BBIC 51 returns to the step S109 and judges whether the data transmission completion signal has been received by the DCL communication control circuit 55.

As above, in the data reception process which is executed by the BBIC 51 of the handset 50 (FIG. 5), when the amount of the data to be received by the handset 50 has been judged by the MFP 10 to be less than the threshold value stored in the threshold memory 14a, the handset 50 receives packet data from the MFP 10 using the DCL communication control circuit 55 (consuming less electric current (per unit time) compared to the WLAN communication control circuit 56) without using the WLAN communication control circuit 56. Thus, the electric power consumption (electric current consumption) can be reduced compared to the case where the data reception from the MFP 10 is executed exclusively using the WLAN communication control circuit 56, by which the consumption of the battery 63 supplying electric power to the whole handset 50 can be reduced.

The data reception process (FIG. 5) is ended when all the packet data (or data) have successfully been received by the handset 50 except when the error display is made. Therefore, the handset 50 can receive all the packet data (or data) from the MFP 10 reliably.

Figure 6:
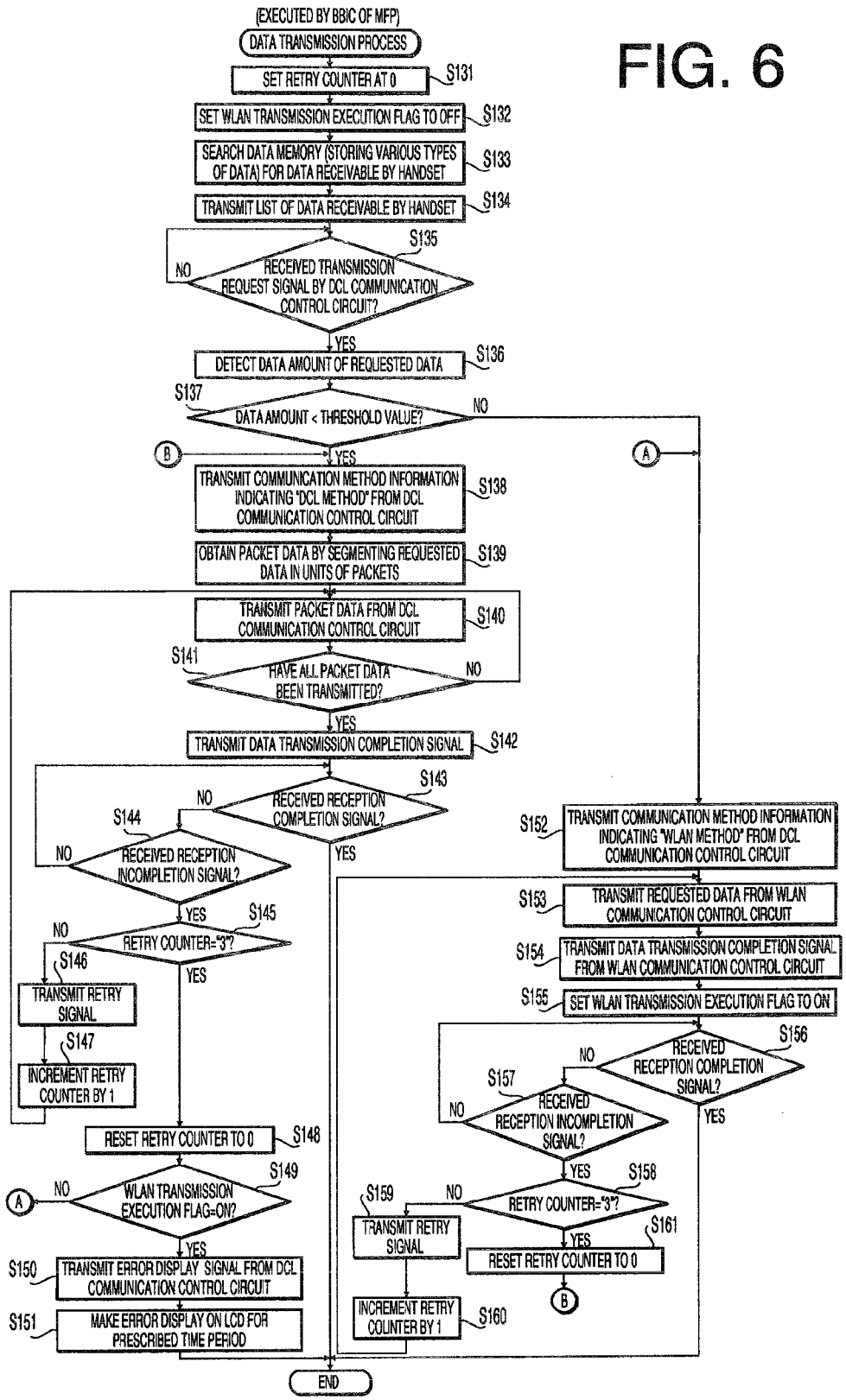
FIG. 6 is a flowchart showing a data transmission process which is executed by the BBIC of the MFP.

Next, the data transmission process executed by the MFP 10 will be explained referring to FIG. 6. The data transmission process (FIG. 6), for selecting the requested data (specified by the transmission request signal from the handset 50) from the various types of data stored in the data memory 14b and transmitting the selected data to the handset 50, is executed when the search request signal (requesting a search for data stored in the data memory 14b) is received by the DCL communication control circuit 15.

In the data transmission process (FIG. 6), the BBIC 11 first sets the retry counter 13a at 0 (S130) and sets the WLAN transmission execution flag 13b to OFF (S132), by which initial setting is completed.

Subsequently, the BBIC 11 searches the data memory 14b (storing various types of data) for data that can be received by the handset 50 (S133), transmits the list of the data receivable by the handset 50 to the handset 50 (S134), and thereafter judges whether the transmission request signal (requesting transmission of data selected through the handset 50) has been received by the DCL communication control circuit 15 (S135).

If the transmission request signal has not been received yet (S135: NO), the step S135 is repeated until the transmission request signal is received. If the transmission request signal has been received (S135: YES), the BBIC 11 detects the data amount of the requested data (S136).

Subsequently, the BBIC 11 judges whether the detected data amount is less than the threshold value stored in the threshold memory 14a (S137). If the data amount is less than the threshold value (S137: YES), the BBIC 11 transmits the communication method information indicating that the communication method to be used is the DCL method to the handset 50 using the DCL communication control circuit 15 (S138). Subsequently, the BBIC 11 obtains the packet data by segmenting the requested data in units of packets (S139), transmits the packet data to the handset 50 using the DCL communication control circuit 15 (S140), and thereafter judges whether the transmission of all the packet data has been completed (S141). If the packet data transmission has not been completed yet (S141: NO), the BBIC 11 returns to the step S140. If the packet data transmission has been completed (S141: YES), the BBIC 11 transmits the data transmission completion signal (indicating that the data transmission by the MFP 10 has been completed) to the handset 50 (S142).

Subsequently, the BBIC 11 judges whether the reception completion signal (indicating that the handset 50 has received all the packet data normally) has been received (S143). If the reception completion signal has been received (S143: YES), the BBIC 11 (recognizing that all the packet data have been received normally by the handset 50) ends the data transmission process (FIG. 6). If the reception completion signal has not been received yet (S143: NO), the BBIC 11 judges whether the reception incompletion signal (indicating that the handset 50 has not received all the packet data) has been received (S144).

If the reception incompletion signal has not been received in S144 (S144: NO), the BBIC 11 returns to the step S143. As above, the steps S143 and S144 are repeated until the reception completion signal or the reception incompletion signal is received. If the reception incompletion signal has been received (S144: YES), the BBIC 11 judges whether the retry counter 13a is at "3", that is, whether the transmission of all the packet data has been executed three times consecutively (S145).

If the retry counter 13a is not at "3" (S145: NO), the BBIC 11 transmits the retry signal (indicating that all the packet data will be transmitted again) to the handset 50 (S146), increments the retry counter 13a by 1 (S147), and returns to the step S140. Incidentally, the handset 50 receiving the retry signal recognizes that the packet data will be retransmitted from the MFP 10.

If the retry counter 13a is at "3" in S145 (S145: YES), it means that the transmission of all the packet data by the DCL method has been executed three times consecutively. In this case, the BBIC 11 resets the retry counter 13a to 0 (S148) and advances to a process from step S149 (in which the communication method is switched to the WLAN method or a transmission error message is displayed). In the step S149, the BBIC 11 judges whether the WLAN transmission execution flag 13b is ON. If the WLAN transmission execution flag 13b is OFF (S149: NO), the BBIC 11 (recognizing that the data have not been transmitted by the WLAN method) advances to a process from step S152 for changing the communication method from the DCL method to the WLAN method.

On the other hand, if the WLAN transmission execution flag 13b is ON (S149: YES), it means that the data has already been transmitted by the WLAN method and thereafter the transmission of all the packet data by the DCL method has already been executed three times consecutively. In this case, in order to stop further data transmission, the BBIC 11 transmits the error display signal (indicating that a transmission error has occurred) using the DCL communication control circuit 15 (S150), makes the error display on the LCD 22 for a prescribed time period (e.g. 5 seconds) (S151), and ends the data transmission process (FIG. 6).

If the detected data amount is the threshold value or more in S137 (S137: NO), the BBIC 11 transmits the communication method information indicating that the communication method to be used is the WLAN method to the handset 50 using the DCL communication control circuit 15 (S152). Subsequently, the BBIC 11 transmits the requested data using the WLAN communication control circuit 17 (S153), transmits the data transmission completion signal by the WLAN communication control circuit 17 (S154), and sets the WLAN transmission execution flag 13b to ON (S155).

Subsequently, the BBIC 11 judges whether or not either the reception completion signal or the reception incompletion signal has been received (S156, S157). If the reception completion signal has been received (S156: YES), the BBIC 11 (recognizing that the data has been received normally by the handset 50) ends the data transmission process (FIG. 6). If the reception incompletion signal has been received (S157: YES), the BBIC 11 (recognizing that the data has not been received normally by the handset 50) judges whether the retry counter 13a is at "3", that is, whether the transmission of the data by the WLAN method has already been executed three times consecutively (S158). If the retry counter 13a is not at "3" (S158: NO), the BBIC 11 transmits the retry signal (indicating that the data will be transmitted again) to the handset 50 (S159), increments the retry counter 13a by 1 (S160), and returns to the step S153.

If the retry counter 13a is at "3" in S158 (S158: YES), the BBIC 11 (recognizing that the transmission of the data by the WLAN method has already been executed three times consecutively) resets the retry counter 13a to 0 (S161) and advances to the step S138 for changing the communication method from the WLAN method to the DCL method again.

As above, in the data transmission process executed by the BBIC 11 of the MFP 10 (FIG. 6), when the amount of data to be received by the handset 50 is judged to be less than the threshold value stored in the threshold memory 14a, the MFP 10 (BBIC 11) segments the data into packet data and transmits the segmented packet data to the handset 50 using the DCL communication control circuit 15. Thus, the requested data (specified by the transmission request signal from the handset 50) can be received normally by the DCL communication control circuit 55 of the handset 50.

Further, in the data transmission process (FIG. 6), the WLAN communication control circuit 17 is used for the transmission of various types of data to the handset 50 only when not all the packet data are received by the handset 50. Thus, the WLAN communication control circuit 56 of the handset 50 (high electric power consumption) is used for the data reception only when not all the packet data are received by the handset 50. Therefore, the MFP 10 is capable of making the handset 50 receive various types of data reliably while also reducing the battery consumption of the handset 50 through the reduction of the use of the WLAN communication control circuit 56 in the handset 50.

As described above, in the wireless communication system 1 in accordance with the embodiment of the present invention, when the amount of data to be transmitted from the handset 50 to the MFP 10 is less than the threshold value stored in the threshold memory 14a, the handset 50 (BBIC 51) segments the data in units of packets and transmits all the segmented packet data to the MFP 10 using the DCL communication control circuit 55 (consuming less electric current (per unit time) compared to the WLAN communication control circuit 56) without using the WLAN communication control circuit 56. Thus, the electric power consumption (electric current consumption) in the handset 50 can be reduced compared to the case where the data transmission from the handset 50 to the MFP 10 is executed exclusively using the WLAN communication control circuit 56, by which the consumption of the battery 63 supplying electric power to the whole handset 50 can be reduced.

In cases where the handset 50 receives data transmitted from the MFP 10, when the amount of data to be received by the handset 50 has been judged by the MFP 10 to be less than the threshold value stored in the threshold memory 14a, the handset 50 receives packet data from the MFP 10 using the DCL communication control circuit 55 (consuming less electric current (per unit time) compared to the WLAN communication control circuit 56) without using the WLAN communication control circuit 56. Thus, the electric power consumption (electric current consumption) in the handset 50 can be reduced compared to the case where the data reception from the MFP 10 is executed exclusively using the WLAN communication control circuit 56, by which the consumption of the battery 63 supplying electric power to the whole handset 50 can be reduced.

In the wireless communication system 1 of this embodiment, when the amount of data to be communicated is less than the threshold value stored in the threshold memory 14a, the data is segmented into packet data and communicated by the DCL method. Thus, the amount of data communicated by the DCL method can be kept less than the threshold value (i.e. the number of pieces of packet data can be kept within a prescribed number), by which the time consumed for the communication of the packet data can be kept within a short time.

Further, the steps of determining whether the communication of various types of data between the MFP 10 and the handset 50 should be executed by the packet data communication by the DCL method or by the data communication by the WLAN method (S73, S74 and S85 in FIG. 4 and S137, S138 and S152 in FIG. 6) are carried out not by the handset 50 but by the MFP 10 in the wireless communication system 1 of this embodiment. Thus, the steps of determining the communication method (key steps essential for the communication) can be integrated into the MFP 10.

Furthermore, the communication of the communication method information, the threshold value, the reception incompletion signal, etc. between the MFP 10 and the handset 50 are executed mainly by the DCL method in the wireless communication system 1 of this embodiment, by which the use of the WLAN communication control circuit 56 (executing wireless communication by the WLAN method) can be reduced and the consumption of the battery 63 as the power source of the handset 50 can be slowed down.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the packet data communication using the DCL communication control circuits 15 and 55 is executed when the amount of data to be communicated is less than the threshold value stored in the threshold memory 14a in the above embodiment, the condition for executing the packet data communication may be set differently; it is possible to equip the handset 50 with a battery charge sensor for detecting the remaining charge of the battery 63 and configure the wireless communication system 1 to carry out the packet data communication using the DCL communication control circuits 15 and 55 (irrespective of the amount of the data to be communicated) when the remaining battery charge detected by the battery charge sensor is lower than a prescribed level. With this configuration, the consumption of the battery 63 can be reduced further when the remaining battery charge has fell below the prescribed level.

While the steps of determining whether the communication of various types of data between the MFP 10 and the handset 50 should be executed by the DCL method or by the WLAN method (S73, S74 and S85 in FIG. 4 and S137, S138 and S152 in FIG. 6) are carried out not by the handset 50 but by the MFP 10 in the above embodiment, the wireless communication system 1 may also be configured so that the steps of determining the communication method can be carried out by the handset 50. With this configuration, the communication method for the data communication between the MFP 10 and the handset 50 can be determined also by the handset 50.

While the threshold value to be stored in the threshold memory 14a is set by the user by operating the operation buttons 59 of the handset 50 in the above embodiment, it is also possible to let the user set the threshold value through the operation buttons 21 of the MFP 10.

What is claimed is:

1. A communication system comprising:
a main communication device including a first communication unit configured to execute wireless communication by a first method which is used mainly for communication of voice data obtained by signal processing of voice and a second communication unit configured to execute wireless communication by a second method which is used for communication of data other than voice data at a higher data transfer rate per unit time than the first method;
an auxiliary communication device operating on electric power supplied by a secondary battery and including a first auxiliary communication unit configured to execute wireless communication with the first communication unit by the first method and a second auxiliary communication unit configured to execute wireless communication with the second communication unit by the second method;
a data amount detecting unit configured to detect the amount of data to be communicated when data other than voice data is communicated;
a communication method determining unit configured to determine whether the communication of the data other than voice data should be executed by the first method or by the second method based on the amount of the data other than voice data detected by the data amount detecting unit, the communication method determining unit including
a threshold storage unit configured to store a threshold value to be used for determining whether the communication of the data other than voice data should be executed by the first method or by the second method; and
a comparison unit configured to compare the amount of the data other than voice data detected by the data amount detecting unit with the threshold value stored in the threshold storage unit, wherein the communication method determining unit is configured to determine that the communication of the data other than voice data should be executed by the first method when the amount of the data other than voice data is judged to be less than the threshold value by the comparison unit;
a data segmentation unit configured to obtain segmented data by segmenting the data other than voice data in prescribed data units when the communication method determining unit determines that the communication of the data other than voice data should be executed by the first method; and
an execution unit configured to make the first communication unit and the first auxiliary communication unit execute the communication of the segmented data obtained by the data segmentation unit by the first method.

2. The communication system according to claim 1, wherein:
the communication method determining unit is placed in the main communication device.

3. The communication system according to claim 1, wherein:
the execution unit is placed in the main communication device and includes:
an execution completion unit configured to make the first communication unit execute the communication of the segmented data by the first method until the communication of all the segmented data is completed in the case where the communication method determining unit has determined that the communication of the data other than voice data should be executed by the first method; and
a communication method information transmission unit configured to make the first communication unit transmit communication method information, indicating that the first method will be used for the communication, by the first method in the case where the execution completion unit makes the first communication unit execute the communication by the first method, and
the auxiliary communication device includes an auxiliary execution completion unit configured to make the first auxiliary communication unit execute the communication of the segmented data by the first method until the completion of the communication of all the segmented data when the communication method information transmitted by the communication method information transmission unit by the first method using the first communication unit is received by the first auxiliary communication unit.

4. The communication system according to claim 3, wherein:
the auxiliary communication device includes an input unit through which the threshold value can be inputted and a threshold transmission unit configured to make the first auxiliary communication unit transmit the inputted threshold value by the first method, and
the main communication device includes a storage control unit configured to store the threshold value in the threshold storage unit when the threshold value transmitted by the threshold transmission unit by the first method using the first auxiliary communication unit is received by the first communication unit.

5. The communication system according to claim 1, wherein:
the auxiliary communication device includes:
an auxiliary judgment unit configured to judge whether all the segmented data transmitted by the first communication unit by the first method have been received successfully by the first auxiliary communication unit or not in cases where the data other than voice data is transmitted from the main communication device to the auxiliary communication device; and an auxiliary incompletion information transmission unit configured to make the first auxiliary communication unit transmit incompletion information, indicating that the reception of all the segmented data by the first auxiliary communication unit has not been completed successfully, by the first method when the auxiliary judgment unit judges that the reception of all the segmented data has not been completed successfully, and the main communication device includes a transmission completion unit configured to make the second communication unit execute the transmission of the data other than voice data by the second method instead of the transmission by the first method until the transmission of the data other than voice data is completed in cases where the incompletion information transmitted by the auxiliary incompletion information transmission unit by the first method using the first auxiliary communication unit is received by the first communication unit.

6. The communication system according to claim 1, wherein:

the main communication device includes:
  a judgment unit configured to judge whether all the segmented data transmitted by the first auxiliary communication unit by the first method have been received successfully by the first communication unit or not in cases where the data other than voice data is transmitted from the auxiliary communication device to the main communication device; and
  an incompletion information transmission unit configured to make the first communication unit transmit incompletion information, indicating that the reception of all the segmented data by the first communication unit has not been completed successfully, by the first method when the judgment unit judges that the reception of all the segmented data has not been completed successfully, and the auxiliary communication device includes an auxiliary transmission completion unit configured to make the second auxiliary communication unit execute the transmission of the data other than voice data by the second method instead of the transmission by the first method until the transmission of the data other than voice data is completed in cases where the incompletion information transmitted by the incompletion information transmission unit by the first method using the first communication unit is received by the first auxiliary communication unit.

7. A communication system comprising:

a main communication device including a first communication unit configured to execute wireless communication by a first method which is used mainly for communication of voice data obtained by signal processing of voice and a second communication unit configured to execute wireless communication by a second method which is used for communication of data other than voice data at a higher data transfer rate per unit time than the first method;

an auxiliary communication device operating on electric power supplied by a secondary battery and including a first auxiliary communication unit configured to execute wireless communication with the first communication unit by the first method and a second auxiliary communication unit configured to execute wireless communication with the second communication unit by the second method;

a data amount detecting unit configured to detect the amount of data to be communicated when data other than voice data is communicated;

a communication method determining unit configured to determine whether the communication of the data other than voice data should be executed by the first method or by the second method based on the amount of the data other than voice data detected by the data amount detecting unit;

a data segmentation unit configured to obtain segmented data by segmenting the data other than voice data in prescribed data units when the communication method determining unit determines that the communication of the data other than voice data should be executed by the first method; and an execution unit configured to make the first communication unit and the first auxiliary communication unit execute the communication of the segmented data obtained by the data segmentation unit by the first method, wherein:

the auxiliary communication device includes a remaining charge detecting unit configured to detect remaining charge of the secondary battery, and the communication method determining unit is further configured to determine that the communication of the data other than voice data should be executed by the first method when the remaining charge detected by the remaining charge detecting unit is lower than a prescribed level.

8. A main communication device of a communication system, comprising:

a first communication unit configured to execute wireless communication with a first auxiliary communication unit of an auxiliary communication device operating on electric power supplied by a secondary battery by a first method which is used mainly for communication of voice data obtained by signal processing of voice;

a second communication unit configured to execute wireless communication with a second auxiliary communication unit of the auxiliary communication device by a second method which is used for communication of data other than voice data at a higher data transfer rate per unit time than the first method;

a data amount detecting unit configured to detect the amount of data to be communicated when data other than voice data is communicated;

a communication method determining unit configured to determine whether the communication of the data other than voice data should be executed by the first method or by the second method based on the amount of the data other than voice data detected by the data amount detecting unit, the communication method determining unit including a threshold storage unit configured to store a threshold value to be used for determining whether the communication of the data other than voice data should be executed by the first method or by the second method; and a comparison unit which compares the amount of the data other than voice data detected by the data amount detecting unit with the threshold value stored in the threshold storage unit, and wherein the communication method determining unit is configured to determine that the communication of the data other than voice data should be executed by the first method when the amount of the data other than voice data is judged to be less than the threshold value by the comparison unit;

a data segmentation unit configured to obtain segmented data by segmenting the data other than voice data in prescribed data units when the communication method determining unit determines that the communication of the data other than voice data should be executed by the first method in data transmission to the auxiliary communication device;

an execution unit configured to make the first communication unit execute the transmission of the segmented data obtained by the data segmentation unit by the first method; and an instruction information transmission unit configured to make the first communication unit transmit instruction information, instructing the auxiliary communication device to transmit data other than voice data by the first method, by the first method when the communication method determining unit determines that the communication of the data other than voice data should be executed by the first method in data reception from the auxiliary communication device.

9. The main communication device according to claim 8, wherein the execution unit includes:

an execution completion unit configured to make the first communication unit execute the transmission of the segmented data by the first method until the transmission of all the segmented data is completed in the case where the communication method determining unit has determined that the communication of the data other than voice data should be executed by the first method in the data transmission to the auxiliary communication device; and a communication method information transmission unit configured to make the first communication unit transmit communication method information, indicating that the first method will be used for the communication, by the first method in the case where the execution completion unit makes the first communication unit execute the transmission of the segmented data by the first method.

10. The main communication device according to claim 8, further comprising a storage control unit configured to store the threshold value in the threshold storage unit when the threshold value is transmitted from the first auxiliary communication unit by the first method and received by the first communication unit.

11. The main communication device according to claim 8, further comprising a transmission completion unit configured to make the second communication unit execute the transmission of the data other than voice data by the second method instead of the transmission by the first method until the transmission of the data other than voice data is completed in cases where incompletion information, indicating that the reception of all the segmented data by the first auxiliary communication unit has not been completed successfully, transmitted from the first auxiliary communication unit by the first method is received by the first communication unit.

12. An auxiliary communication device of a communication system, comprising:

a secondary battery configured to supply electric power for the operation of the auxiliary communication device;

a first auxiliary communication unit configured to execute wireless communication with a first communication unit by a first method which is used mainly for communication of voice data obtained by signal processing of voice;

a second auxiliary communication unit configured to execute wireless communication with a second communication unit by a second method which is used for communication of data other than voice data at a higher data transfer rate per unit time than the first method, the first and second auxiliary communication units operating on electric power supplied by the secondary battery;

a data amount detecting unit configured to detect the amount of data to be transmitted when data other than voice data is transmitted;

a communication method determining unit configured to determine whether the communication of the data other than voice data should be executed by the first method or by the second method based on the amount of the data other than voice data detected by the data amount detecting unit, the communication method determining unit including a threshold storage unit configured to store a threshold value to be used for determining whether the communication of the data other than voice data should be executed by the first method or by the second method; and a comparison unit configured to compare the amount of the data other than voice data detected by the data amount detecting unit with the threshold value stored in the threshold storage unit, wherein the communication method determining unit is configured to determine that the communication of the data other than voice data should be executed by the first method when the amount of the data other than voice data is judged to be less than the threshold value by the comparison unit;

a data segmentation unit configured to obtain segmented data by segmenting the data other than voice data in prescribed data units when the communication method determining unit determines that the communication of the data other than voice data should be executed by the first method; and an auxiliary execution unit configured to make the first auxiliary communication unit execute the transmission of the segmented data obtained by the data segmentation unit by the first method.

13. The auxiliary communication device according to claim 12, further comprising:

an input unit through which the threshold value, to be used for determining whether the communication of the data other than voice data should be executed by the first method or by the second method, can be inputted; and a threshold transmission unit configured to make the first auxiliary communication unit transmit the inputted threshold value by the first method.

14. The auxiliary communication device according to claim 12, further comprising an auxiliary transmission completion unit configured to make the second auxiliary communication unit execute the transmission of the data other than voice data by the second method instead of the transmission by the first method until the transmission of the data other than voice data is completed in cases where incompletion information, indicating that the reception of all the segmented data by the first communication unit has not been completed successfully, transmitted from the first communication unit by the first method is received by the first auxiliary communication unit.

15. An auxiliary communication device of a communication system, comprising:

a secondary battery configured to supply electric power for the operation of the auxiliary communication device;

a first auxiliary communication unit configured to execute wireless communication with a first communication unit of a main communication device of the communication system by a first method which is used mainly for communication of voice data obtained by signal processing of voice;

a second auxiliary communication unit configured to execute wireless communication with a second communication unit of the main communication device by a second method which is used for communication of data other than voice data at a higher data transfer rate per unit time than the first method;

a remaining charge detecting unit configured to detect remaining charge of the secondary battery;

a communication method determining unit configured to determine that the communication of the data other than voice data should be executed by the first method when the remaining charge detected by the remaining charge detecting unit is lower than a prescribed level;

a data amount detecting unit configured to detect the amount of data to be transmitted when data other than voice data is transmitted to the main communication device;

a data amount transmission unit configured to make the first auxiliary communication unit transmit data amount information, indicating the amount of the data other than voice data detected by the data amount detecting unit, by the first method;

a data segmentation unit configured to obtain segmented data by segmenting the data other than voice data in prescribed data units when instruction information, ordering the transmission of the data other than voice data by the first method, is received by the first auxiliary communication unit in response to the data amount information transmitted by the data amount transmission unit using the first auxiliary communication unit and when the communication method determining unit determines that the communication of the data other than voice data should be executed by the first method; and an auxiliary execution unit configured to make the first auxiliary communication unit execute the transmission of the segmented data obtained by the data segmentation unit by the first method.

* * * * *